(12) United States Patent
Park et al.

(10) Patent No.: US 8,449,996 B2
(45) Date of Patent: May 28, 2013

(54) BATTERY PACK

(75) Inventors: Seokryun Park, Yongin-si (KR); Kyungho Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 304 days.

(21) Appl. No.: 12/899,415

(22) Filed: Oct. 6, 2010

(65) Prior Publication Data

US 2011/0086245 A1    Apr. 14, 2011

(30) Foreign Application Priority Data

Oct. 9, 2009 (KR) ........................ 10-2009-0096104

(51) Int. Cl.
  *H01M 2/34*   (2006.01)
  *H01M 2/10*   (2006.01)

(52) U.S. Cl.
  USPC ............................................................. 429/7

(58) Field of Classification Search
  USPC ............................................................. 429/7
  See application file for complete search history.

(56) References Cited

U.S. PATENT DOCUMENTS

| 2004/0251872 A1 | 12/2004 | Wang et al. | |
| 2008/0152994 A1* | 6/2008 | Yamagami et al. | 429/100 |
| 2008/0226980 A1* | 9/2008 | Kim | 429/164 |
| 2009/0130554 A1* | 5/2009 | Jang et al. | 429/179 |

FOREIGN PATENT DOCUMENTS

| JP | 2001-196048 | 7/2001 |
| KR | 10-0685115 B1 | 2/2007 |
| KR | 10-0685605 B1 | 2/2007 |
| KR | 10-0723668 B1 | 5/2007 |
| KR | 1020080038663 A | 5/2008 |
| KR | 1020090018189 A | 2/2009 |
| KR | 1020090075396 A | 7/2009 |
| WO | WO 2008/047986 A1 | 4/2008 |
| WO | WO 2008/066222 A1 | 6/2008 |

OTHER PUBLICATIONS

Patent Abstracts of Japan, and English machine translation of Japanese Publication 2001-196048, listed above, 12 pages.
Korean Patent Abstracts, Publication No. 10-2006-0032591, dated Apr. 17, 2006, corresponding to Korean Patent 10-0723668, listed above, and corresponds to U.S. Publication 2004/0251872, also listed above.

* cited by examiner

*Primary Examiner* — Gregg Cantelmo
(74) *Attorney, Agent, or Firm* — Christie, Parker & Hale, LLP

(57) ABSTRACT

A battery pack including a bare cell including an electrode assembly inserted therein, a holder case fixed to one side of the bare cell, a protective circuit board seated on the holder case and including a protection circuit electrically connected to the bare cell to control charging or discharging thereof, a first metal member fixed to the protective circuit board, and a second metal member fixed to the holder case and connected to the first metal member.

19 Claims, 4 Drawing Sheets

BATTERY PACK

CROSS-REFERENCE TO RELATED APPLICATION

This application claims the benefit of Korean Application No. 10-2009-0096104, filed in the Korean Intellectual Property Office on Oct. 9, 2009, the disclosure of which is incorporated herein by reference.

BACKGROUND

1. Field

Aspects of the present invention relate to a battery pack.

2. Description of the Related Art

In a secondary battery, a protective circuit module is generally provided to control charging and discharging operations and a holder case is provided to securely couple the protective circuit module to one side of a bare cell. The protective circuit module and the holder case are usually constructed separately. Accordingly, it is often the case that the protective circuit module and the holder case may not be tightly combined with each other, and an additional process to tightly combine the protective circuit module with the holder case to each other must be performed separately.

SUMMARY

Aspects of the present invention provide a battery pack in which a protective circuit module can be fixed to side surfaces of a bare cell in a more secured manner.

According to an aspect of the present invention, a battery pack is provided. The battery pack includes a bare cell having an electrode assembly inserted therein, a holder case fixed to one side of the bare cell; a protective circuit board seated on the holder case and including a protection circuit electrically connected to the bare cell to control charging or discharging thereof, a first metal member fixed to the protective circuit board, and a second metal member fixed to the holder case and connected to the first metal member.

According to another aspect of the present invention, the first metal member may be made of copper (Cu), and the second metal member may be made of nickel (Ni).

According to another aspect of the present invention, the protective circuit board may include combining grooves formed at opposing edges of the protective circuit board, and the first metal member may be plated to the combining grooves. One end of the second metal member may be shaped in the same manner with the combining grooves, and the second metal member may be in close contact with an entire surface of the first metal member.

According to another aspect of the present invention, the second metal member may be integrally formed with the holder case by insert molding. The first metal member and the second metal member may be soldered to each other so as to be securely fixed to the protective circuit board and the holder case.

According to another aspect of the present invention, the holder case may include a seating portion on which the protective circuit board is seated, and side portions directly extending upward from two sides of the seating portion and having an internal surface thereof opposed to two corresponding edges of the protective circuit board.

According to another aspect of the present invention, the second metal member may include a first horizontal portion combined with a top surface of the seating portion, and a first vertical portion extending directly upward from two sides of the first horizontal portion and combined with the side portions. One end of the first vertical portion may be soldered to the first metal member. The second metal member may further include a second horizontal portion extending from an end of the first vertical portion in parallel with the first horizontal portion, and a bottom surface of the second horizontal portion in close contact with a top surface of the protective circuit board. The second horizontal portion may have an inclined surface sloping downward toward the protective circuit board.

According to another aspect of the present invention, the second metal member may be bar-shaped and combined with the side portion, and may have one end soldered to the first metal member. The second metal member may include a third horizontal portion in close contact with a bottom surface of the seating portion, a second vertical portion extending directly upward from two ends of the third horizontal portion and in close contact with outer walls of the side portions, and a fourth horizontal portion extending from an end of the second vertical portion in parallel with the third horizontal portion. One end of the second vertical portion may be soldered to the first metal member, and a bottom surface of the fourth horizontal portion may be in close contact with a top surface of the protective circuit board.

According to aspects of the present invention, the protective circuit module and the holder case may be integrally combined with each other.

In addition, according aspects of the present invention, the battery pack can be manufactured in a simplified manner.

Further, according to aspects the present invention, the protective circuit module can be fixed in the bare cell in a more secured manner.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
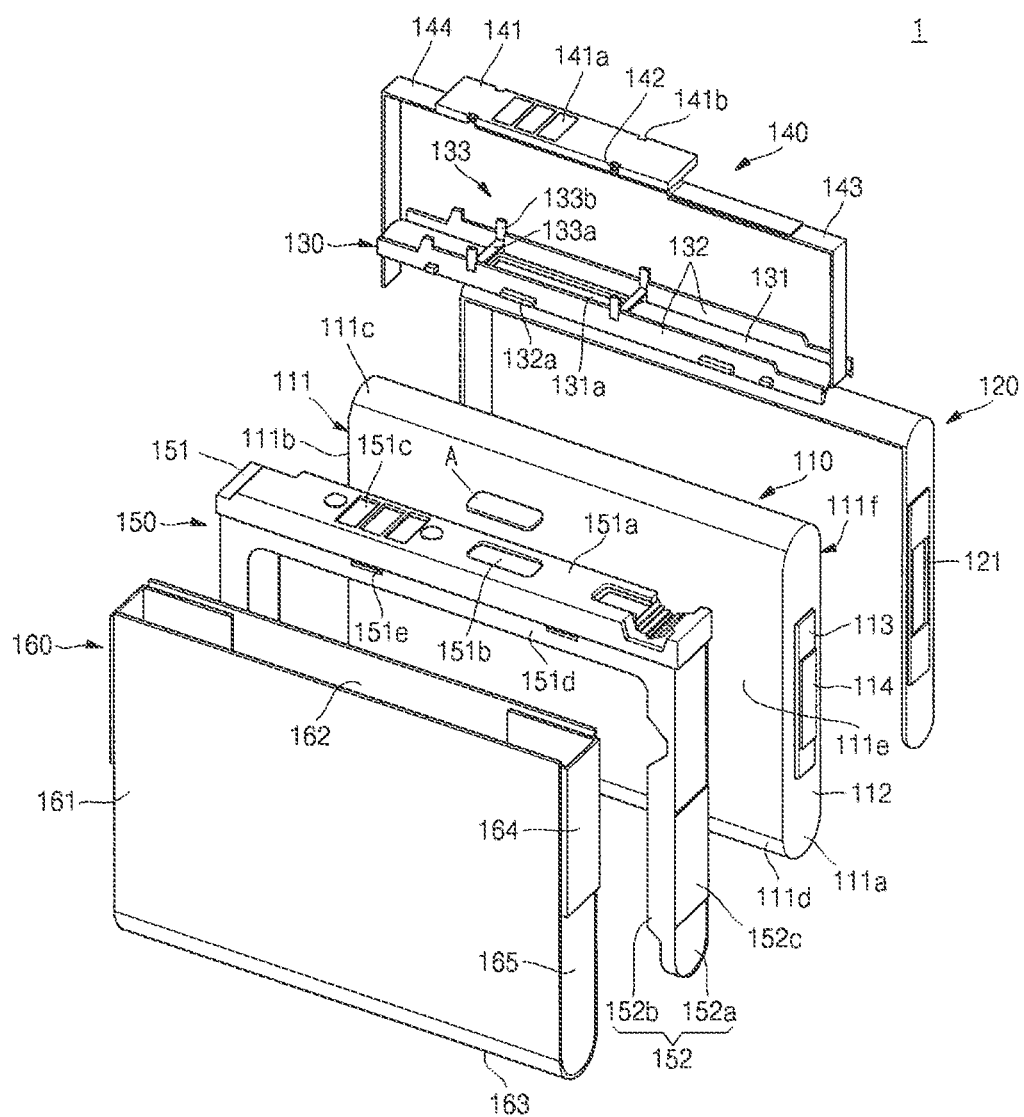
FIG. 1 is an exploded perspective view illustrating a battery pack according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
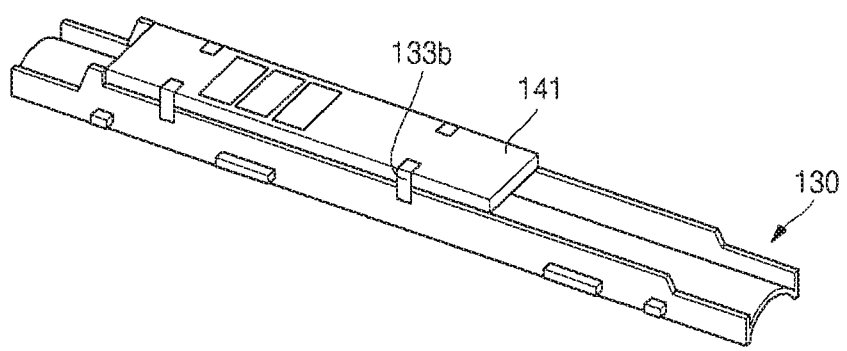
FIG. 2 is an exploded perspective view illustrating a holder case combined with the protective circuit board shown in FIG. 1.

FIG. 1 is an exploded perspective view illustrating a battery pack according to an embodiment of the present invention, and FIG. 2 is an exploded perspective view illustrating the holder case combined with the protective circuit board shown in FIG. 1. Referring to FIGS. 1 and 2, the battery pack 1 includes a bare cell 110, a double sided tape 120, a holder case 130, a protective circuit board 140, a frame case 150, and a label 160. According to other aspects of the present invention, the battery pack may include additional and/or different components.

The bare cell 110 is substantially cube shaped. The bare cell 110 includes a can 111, a cap plate 112, a gasket 113, and an electrode terminal 114. One end of the can 111 is open. An electrode assembly (not shown) may be received in the can 111. The electrode assembly includes a positive electrode plate, a negative electrode plate, and a separator interposed between the positive electrode plate and the negative electrode plate. The electrode assembly may be formed in a stack configuration or a jelly-roll configuration, although aspects of the present invention are not limited thereto.

The cap plate 112 closes and seals the open end of the can 111. The cap plate 112 has a terminal hole (not shown). The electrode terminal 114 is drawn outside through the terminal hole such that the electrode terminal 114 is insulated from the cap plate 112 by the gasket 113.

The electrode terminal 114 is electrically coupled to the positive electrode plate or the negative electrode plate. The can 111 is electrically coupled to an electrode plate having polarity opposite to the electrode terminal 114.

A surface of the bare cell 110 having the cap plate 112 is referred to as a first surface 111a, and a surface opposed to the first surface 111a is referred to as a second surface 111b. A relatively narrow surface between the first surface 111a and the second surface 111b is referred to as a third surface 111c, and a surface opposed to the third surface 111c is referred to as a fourth surface 111d. A relatively wide surface between the first surface 111a and the second surface 111b is referred to as a fifth surface 111e, and a surface opposed to the fifth surface 111e is referred to as a sixth surface 111f.

The double sided tape 120 may be attached to some portions of the first surface 111a, the second surface 111b and/or the third surface 111c. The double sided tape 120 includes a terminal hole 121 exposing the electrode terminal 114.

The holder case 130 includes a seating portion 131, side portions 132, and a second metal member 133. The seating portion 131 may be shaped as a rectangle having the same width as that of the third surface 111c. The seating portion 131 is seated on a top surface of the double sided tape 120 along the length of the third surface 111c to be fixed to the third surface 111c. A device groove 131a is formed to extend downward through the seating portion 131. The side portions 132 extend directly upward from long edges of the seating portion 131. Each of the side portions 132 has a protrusion 132a extending outward.

The second metal member 133 is made of a metal, for example, nickel, but aspects of the present invention are not limited thereto. The second metal member 133 may alternatively be made of any appropriate metal. The second metal member 133 has a "U" shaped sectional shape. The second metal member 133 is integrally formed with the seating portion 131 and the side portions 132 by insert molding. The second metal member 133 includes a first horizontal portion 133a combined with the top surface of the seating portion 131 and first vertical portions 133b combined with the side portions 132. The first vertical portion 133b extends directly upward from both sides of the first horizontal portion 133. As shown in the Figures, the holder case may include pairs of second metal members 133. According to other aspects of the present invention, more or fewer second metal members 133 may be provided, and the second metal member 133 need not be provided in pairs.

The protective circuit module 140 includes a protective circuit board 141, a first metal member 142, a first lead 143 and a second lead 144. Top and bottom surfaces of the protective circuit board 141 may be shaped as a rectangle having the same width as the width of the seating portion 131. A protection circuit (not shown) configured of an active or passive circuit device is mounted on the protective circuit board 141 to provide for a circuit capable of controlling charging or discharging of the electrode assembly. An external terminal 141a electrically connected to an external device is provided on the top surface of the protective circuit board 141. The protection circuit of the protective circuit board 141 is seated on the seating portion 131 through the device groove 131a of the holder case 130. Combining grooves 141b are formed at opposing long edges of the protective circuit board 141.

The first metal member 142 is made of a conductive material to be plated to the combining grooves 141b. According to aspects of the present invention, more than one first metal member 142 may be provided, and the first metal member 142 may be provided in pairs. The first metal member 142 is made of, for example, copper (Cu). Aspects of the present invention are not limited thereto, and the first metal member may be made of any conductive metal.

The first metal member 142 is combined with the second metal member 133 to then be securely integrated with the protective circuit board 141 and the holder case 130. The first metal member 142 is soldered to the second metal member 133. In order to improve a combining strength between the first metal member 142 and the second vertical portions 133b, one end of the second metal member 133 may be shaped in the same manner with the combining grooves 141b, so that the second metal member 133 is brought into close contact with the entire surface of the first metal member 142.

One end of the first lead 143 is electrically connected to the protective circuit board 141. The other end is electrically connected to the electrode terminal 114 of the bare cell 110. Similarly, one end of the second lead 144 is electrically connected to the protective circuit board 141, and the other end is electrically connected to the second surface 111b of the bare cell 110.

The frame case 150 includes a main frame 151 and a sub-frame 152. The main frame 151 includes a base 151a and sides 151d. An internal surface of the base 151a is in close contact with the third surface 111c of the bare cell 110. The base 151a includes an attachment portion 151b and a terminal exposing portion 151c. A submersion label indicated by reference character 'A' may be adhered to the attachment portion 151b. The terminal exposing portion 151c exposes the external terminal 141a of the protective circuit board 141 to the outside of the frame 150.

The sides 151d extend directly downward from long edges of the base 151a. An internal surface of the sides 151d is in close contact with the fifth surface 111e of the bare cell 110. Protrusion receiving holes 151e are formed in the sides 151d. Each of the protrusion receiving holes 151e extend through the sides 151d and are disposed to be opposite to and facing each other. The main frame 151 and the holder case 130 are combined with each other such that the protrusions 132a are inserted into the protrusion receiving holes 151e.

The sub-frame 152 extends directly downward from short edges of the main frame 151. The sub-frame 152 includes a sub-base 152a and sub-sides 152b. An internal surface of the sub-base 152a is in close contact with the first surface 111a of the bare cell 110. A rising portion 152c is provided on an outer surface of the sub-base 152a. The sub-sides 152b extend from long edges of the sub-base 152a to be in close contact with the fifth surface 111e of the bare cell 110.

The label 160 includes a front surface 161, a rear surface 162, a bent portion 163, connecting portions 164, and opening portions 165. The front surface 161 is opposed to the fifth surface 111e of the bare cell 110, while the rear surface 162 is opposed to the sixth surface 111f of the bare cell 110. Both sides of the front surface 161 are in close contact with outer surfaces of the sub-sides 152b.

The bent portion 163 is bent in an arc shape and allows long edges of the front surface 161 and the rear surface 162 to be connected to each other. The bent portion 163 is in close contact with the fourth surface 111d of the bare cell 110.

The connecting portions 164 extend from short edges of the front surface 161 and are fixed to the rear surface 162, allowing the bent portion 163 to be kept bent. Each of the opening portions 165, formed at the respective lower parts of the connecting portions 164, is coupled to the rising portion 152c.

Figure 3:
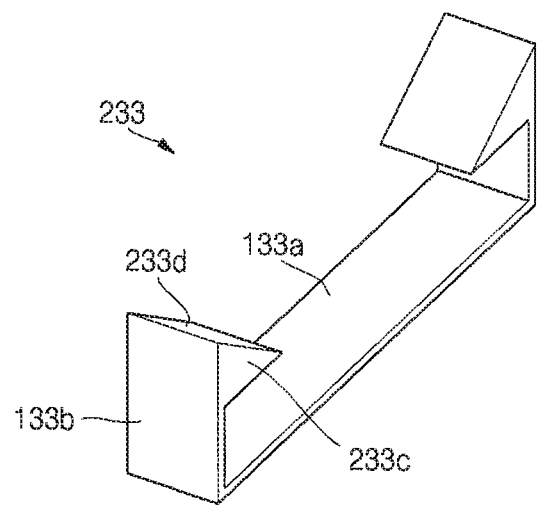
FIG. 3 is an exploded perspective view illustrating a second metal member in a battery pack according to another embodiment of the present invention.
Figure 4:
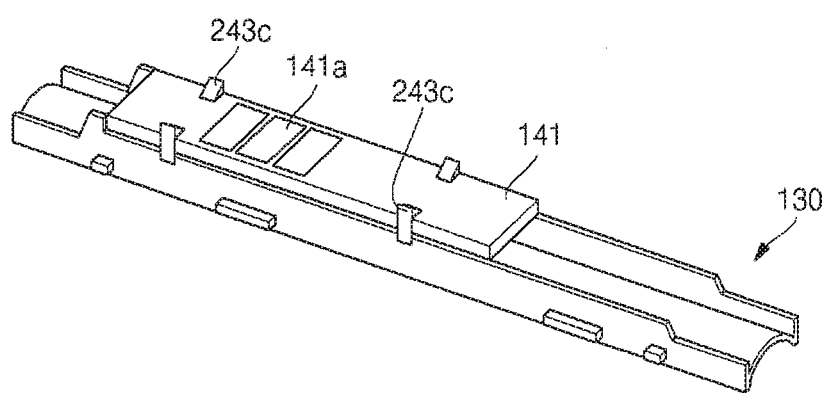
FIG. 4 is an exploded perspective view illustrating the second metal member shown in FIG. 3 combined with a first metal member.

Hereinafter, a battery pack according to another embodiment of the present invention will be described with reference to FIGS. 1 to 4. FIG. 3 is an exploded perspective view illustrating a second metal member in a battery pack according to another embodiment of the present invention, and FIG. 4 is an exploded perspective view illustrating the second metal member shown in FIG. 3 combined with a first metal member 142, in which the functional elements having the same configurations as those shown in FIGS. 1 and 2 are denoted by the same reference numerals.

Referring to FIGS. 1 to 4, the second metal member 233 further includes a second horizontal portion 233c. The second horizontal portion 233c extends from an end of the first vertical portion 133b in parallel with the first horizontal portion 133a. Since a bottom surface of the second horizontal portion 233c is in close contact with a top surface of the protective circuit board 141, the protective circuit module 140 can be fixed to the holder case more securely. The protective circuit board 141 is seated on a seating portion 131 such that the second horizontal portion 233c is pushed away outward. In order to efficiently push the second horizontal portion 233c away outward, an inclined surface 233d is provided on both sides of the second horizontal portion 233c. The inclined surface 233d has a slope descending from the end of the first vertical portion 133b toward the protection circuit board 141. The protective circuit board 141 is inserted into the holder case 130 through the inclined surfaces 233d.

Figure 5:
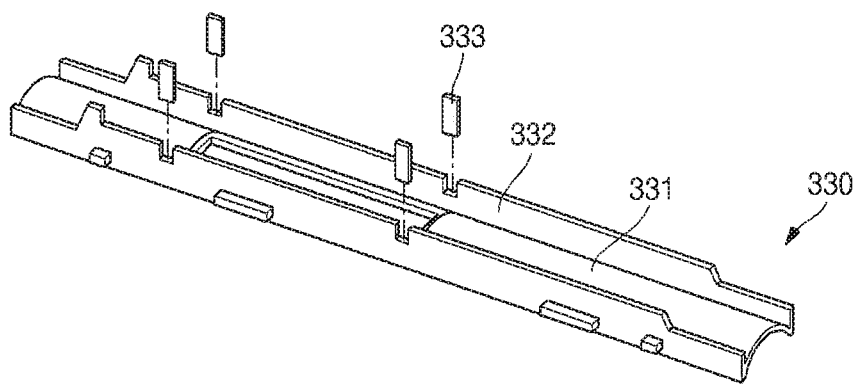
FIG. 5 is an exploded perspective view illustrating a holder case in a battery pack according to still another embodiment of the present invention.

A battery pack according to still another embodiment of the present invention will now be described with reference to FIGS. 1, 2, and 5. FIG. 5 is an exploded perspective view illustrating a holder case 330 in a battery pack according to still another embodiment of the present invention.

Referring to FIG. 5, bar-shaped second metal members 333 are formed at side portions 332. The second metal members 333 may be integrally formed with the side portions 332 by insert molding. One end of each of the second metal members 333 are soldered to the first metal members 142. In such a manner, the protective circuit module 140 can be fixed to the holder case 130 more securely.

Figure 6:
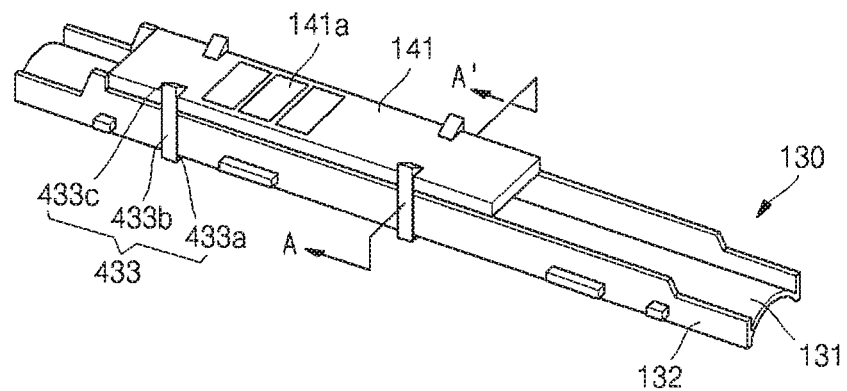
FIG. 6 is a perspective view illustrating a protective circuit board seated in a holder case in a battery pack according to yet another embodiment of the present invention.

FIG. 6 is a perspective view illustrating a protective circuit board seated in a holder case in a battery pack according to yet another embodiment of the present invention.

Referring to FIG. 6, a second metal member 433 includes a third horizontal portion 433a, a second vertical portion 433b, and a fourth horizontal portion 433c. The third horizontal portion 433a is in close contact with a bottom surface of the seating portion 131. The second vertical portion 433b extends directly upward from both ends of the third horizontal portion 433a. The second vertical portion 433b is in close contact with outer walls of side portions 132. Since one side of the second vertical portions 433b are soldered to the first metal members 133, the protective circuit module 140 can be fixed to the holder case 130 more securely.

The fourth horizontal portion 433c extends from an end of the second vertical portion 433b in parallel with the third horizontal portion 433a. A bottom surface of the fourth horizontal portion 433c is brought into close contact with a top surface of the protective circuit board 141. In such a manner, the fourth horizontal portion 433c allows the protective circuit module 140 to be combined with the holder case 130 more securely.

The protective circuit board 141 is seated on the seating portion 131 such that the fourth horizontal portion 433c is pushed away outward. In order to efficiently push the fourth horizontal portion 433c away outward, the fourth horizontal portion 433c may have an inclined surface with a slope descending from the end of the second vertical portion 433b toward the protection circuit board 141. The second metal member 433 may made of metal, for example, nickel (Ni), although aspects of the present invention are not limited to a particular metal.

Figure 7:
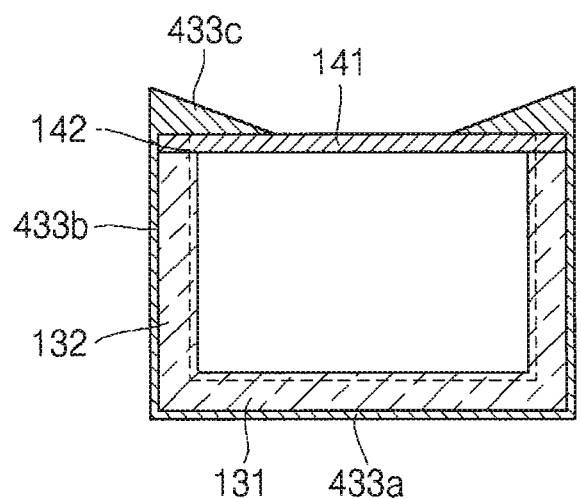
FIG. 7 is a cross-sectional view taken along line A-A' of FIG. 6.

FIG. 7 is a cross-sectional view taken along line A-A' of FIG. 6. Referring to FIG. 7, the third horizontal portion 433a is combined with a bottom surface of a seating portion 131 via insert molding, and a second vertical portion 433b is combined with the outer wall of a side portion 132 via insert molding. In such a manner, the protective circuit board 141 can be fixed to the holder case 130 more securely.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A battery pack, comprising:
   a bare cell including an electrode assembly inserted therein;
   a holder case fixed to one side of the bare cell;
   a protective circuit board seated on the holder case and including a protection circuit electrically connected to the bare cell to control charging or discharging thereof and combining grooves located at opposing edges of the protective circuit board;
   a first metal member fixed to the protective circuit board, wherein the first metal member is plated to the combining grooves; and
   a second metal member fixed to the holder case and connected to the first metal member.

2. The battery pack of claim 1, wherein the first metal member is made of copper (Cu).

3. The battery pack of claim 1, wherein the second metal member is made of nickel (Ni).

4. The battery pack of claim 1, wherein:
   one end of the second metal member is shaped in the same manner with the combining grooves, and
   the second metal member is brought into close contact with an entire surface of the first metal member.

5. The battery pack of claim 1, wherein the second metal member is integrally formed with the holder case via insert molding.

6. The battery pack of claim 1, wherein the first metal member and the second metal member are soldered to each other so as to be securely fixed to the protective circuit board and the holder case.

7. The battery pack of claim 1, wherein the holder case comprises:
- a seating portion on which the protective circuit board is seated; and
- side portions directly extending upward from two sides of the seating portion and having an internal surface thereof opposed to two corresponding edges of the protective circuit board.

8. The battery pack of claim 7, wherein the second metal member comprises:
- a first horizontal portion combined with a top surface of the seating portion; and
- a first vertical portion extending directly upward from two sides of the first horizontal portion and combined with the side portions;
- wherein one end of the first vertical portion is soldered to the first metal member.

9. The battery pack of claim 8, wherein the second metal member further comprises a second horizontal portion extending from an end of the first vertical portion in parallel with the first horizontal portion, and a bottom surface of the second horizontal portion is in a close contact with a top surface of the protective circuit board.

10. The battery pack of claim 9, wherein the second horizontal portion has an inclined surface sloping downward toward the protective circuit board.

11. The battery pack of claim 7, wherein the second metal member is bar-shaped and combined with the side portion, and has one end soldered to the first metal member.

12. The battery pack of claim 7, wherein the second metal member comprises:
- a third horizontal portion in close contact with a bottom surface of the seating portion;
- a second vertical portion extending directly upward from two ends of the third horizontal portion and in close contact with outer walls of the side portions; and
- a fourth horizontal portion extending from an end of the second vertical portion in parallel with the third horizontal portion;
- wherein one end of the second vertical portion is soldered to the first metal member, and a bottom surface of the fourth horizontal portion is in close contact with a top surface of the protective circuit board.

13. The battery pack of claim 12, wherein the fourth horizontal portion has an inclined surface sloping downward toward the protection circuit board.

14. The battery pack of claim 12, wherein:
- the third horizontal portion is combined with the bottom surface of the seating portion via insert molding; and
- the second vertical portion is combined with the outer walls of the side portions by insert molding.

15. The battery pack of claim 1, wherein the second metal member comprises two second metal members arranged at different sides of the holder case.

16. The battery pack of claim 1, further comprising a frame case surrounding the bare cell and the protective circuit board, the frame case including:
- a main frame in contact with the side of the bare cell connected to the holder case; and
- a sub-frame extending downward from the main frame and in contact with two sides of the bare cell other than the side of the bare cell in contact with the main frame.

17. The battery pack of claim 16, wherein the main frame comprises:
- a base contacting with the side of the bare cell; and
- sides extending directly downward from long edges of the base.

18. The battery pack of claim 17, wherein the base comprises:
- an attachment portion which a submersion label is adhered to; and
- a terminal exposing portion exposing an external terminal of the protective circuit board to the outside of the frame case.

19. The battery pack of claim 16, further comprising a label surrounding the bare cell and the frame case and including a front surface, a rear surface, a bent portion, connecting portions, and opening portions.

* * * * *

UNITED STATES PATENT AND TRADEMARK OFFICE
CERTIFICATE OF CORRECTION

Page 1 of 1

PATENT NO. : 8,449,996 B2
APPLICATION NO. : 12/899415
DATED : May 28, 2013
INVENTOR(S) : Seokryun Park et al.

It is certified that error appears in the above-identified patent and that said Letters Patent is hereby corrected as shown below:

In the Claims

Column 8, Claim 13, line 10  Delete "protection"

Insert -- protective --

Signed and Sealed this
Tenth Day of February, 2015

Michelle K. Lee
*Deputy Director of the United States Patent and Trademark Office*